United States Patent
King et al.

(10) Patent No.: US 9,719,263 B1
(45) Date of Patent: Aug. 1, 2017

(54) SYSTEM, KIT, AND METHOD OF RESURFACING AND/OR EMBELLISHING A COUNTERTOP

(71) Applicant: King Conroy, LLC, Omaha, NE (US)

(72) Inventors: Kelly S. King, Omaha, NE (US); Michael C. Conroy, Wheaton, MN (US)

(73) Assignee: King Conroy, LLC, Omaha, NE (US)

( * ) Notice: Subject to any disclaimer, the term of this patent is extended or adjusted under 35 U.S.C. 154(b) by 162 days.

(21) Appl. No.: 14/867,945

(22) Filed: Sep. 28, 2015

Related U.S. Application Data

(60) Provisional application No. 62/056,593, filed on Sep. 28, 2014.

(51) Int. Cl.

| | |
|---|---|
| *E04F 13/00* | (2006.01) |
| *E04F 13/07* | (2006.01) |
| *E04F 13/08* | (2006.01) |
| *E04F 13/14* | (2006.01) |
| *B29C 65/52* | (2006.01) |
| *B29C 65/54* | (2006.01) |
| *B32B 27/04* | (2006.01) |
| *B32B 37/12* | (2006.01) |
| *B32B 38/16* | (2006.01) |
| *A47B 13/08* | (2006.01) |

(52) U.S. Cl.
CPC .......... *E04F 13/002* (2013.01); *A47B 13/086* (2013.01)

(58) Field of Classification Search
USPC .......... 156/71, 278, 280, 281, 307.1, 307.3, 156/307.4, 307.5
See application file for complete search history.

(56) References Cited

U.S. PATENT DOCUMENTS

| | | | | |
|---|---|---|---|---|
| 4,473,422 A | * | 9/1984 | Parker | ................... D21H 19/02 156/233 |
| 4,801,005 A | * | 1/1989 | Hahn | ................... F16N 31/006 141/86 |

(Continued)

FOREIGN PATENT DOCUMENTS

JP 2015045191 A * 3/2015

OTHER PUBLICATIONS

English Abstract of JP 2005-045191 (Apr. 30, 2017).*

*Primary Examiner* — Sing P Chan
(74) *Attorney, Agent, or Firm* — Kutak Rock LLP; Bryan P. Stanley

(57) ABSTRACT

A system, kit, and method of resurfacing and/or embellishing a surface is provided. The kit includes a plurality of materials, such as cleaner, primer, adhesive, paper, and sealer. Each material is provided in a quantity for covering a pre-determined area such that the kit is capable of refinishing and/or embellishing a surface having a size equal to the pre-determined area. The kit also includes tools for refinishing and/or embellishing the surface. The method includes cleaning and priming the surface, cutting and/or tearing paper, adhering the paper to the primed surface, and sealing the paper between the surface and a sealer layer. The system and method enables a user to resurface a variety of surfaces, including surfaces that include a variety of edges, corners, curves, and/or recessed areas, enabling the user to transform the appearance of the surface so that it resembles a more expensive surface, such as natural stone.

20 Claims, 6 Drawing Sheets

(56) References Cited

U.S. PATENT DOCUMENTS

| | | | | |
|---|---|---|---|---|
| 5,059,264 A * | | 10/1991 | Sheets | B27N 7/005 156/62.2 |
| 5,204,148 A * | | 4/1993 | Alexander et al. | E04D 5/145 428/141 |
| 5,300,558 A * | | 4/1994 | Kurisu | C09D 4/00 524/707 |
| 5,747,561 A * | | 5/1998 | Smirnov | C08J 3/091 106/14.37 |
| 6,258,412 B1 * | | 7/2001 | Ewing | C09D 5/06 427/387 |
| 6,423,379 B1 * | | 7/2002 | Ewing | C09D 5/06 427/387 |
| 6,695,514 B1 * | | 2/2004 | Hills | B05C 17/00 401/123 |
| 6,713,144 B2 * | | 3/2004 | Bundo | B32B 27/08 428/200 |
| 6,824,639 B1 * | | 11/2004 | Hill | B44C 1/1716 156/230 |
| 7,081,300 B2 * | | 7/2006 | Laurence | B32B 27/36 428/147 |
| 7,141,625 B2 * | | 11/2006 | Komazaki | C08F 283/01 524/501 |
| 7,524,516 B2 * | | 4/2009 | Arafat et al. | A61K 33/00 206/223 |
| 7,537,111 B2 * | | 5/2009 | Hart | B44D 3/125 206/209 |
| 7,541,393 B2 * | | 6/2009 | Mitra et al. | A61K 6/0023 433/228.1 |
| 7,629,400 B2 * | | 12/2009 | Hyman | B41M 1/30 524/106 |
| 7,802,415 B2 * | | 9/2010 | Pervan | E04F 15/04 428/50 |
| 7,833,611 B2 * | | 11/2010 | Phan | B32B 7/12 264/211.21 |
| 7,861,730 B2 * | | 1/2011 | Jordan | A45D 29/001 132/200 |
| 7,960,000 B2 * | | 6/2011 | Newman | B08B 7/0028 428/192 |
| 8,028,486 B2 * | | 10/2011 | Pervan | E04F 15/04 428/50 |
| 8,067,087 B2 * | | 11/2011 | Katchko | B32B 7/12 428/343 |
| 8,584,423 B2 * | | 11/2013 | Pervan | E04F 15/04 52/390 |
| 8,592,501 B2 * | | 11/2013 | Phan | B32B 9/02 428/201 |
| 8,921,473 B1 * | | 12/2014 | Hyman | C08K 3/04 423/445 R |
| 8,962,134 B2 * | | 2/2015 | Pachl | C08F 2/48 156/330 |
| 2002/0160680 A1 * | | 10/2002 | Laurence | B32B 27/36 442/394 |
| 2003/0024199 A1 * | | 2/2003 | Pervan | E04F 15/04 52/589.1 |
| 2003/0035917 A1 * | | 2/2003 | Hyman | B41M 1/30 428/67 |
| 2003/0099828 A1 * | | 5/2003 | Bundo | B32B 27/08 428/352 |
| 2004/0242756 A1 * | | 12/2004 | Komazaki | C08F 283/01 524/501 |
| 2006/0054527 A1 * | | 3/2006 | Hart | B44D 3/125 206/459.5 |
| 2006/0157195 A1 * | | 7/2006 | Laurence | B32B 27/36 156/307.1 |
| 2007/0054117 A1 * | | 3/2007 | Katchko | B32B 7/12 428/346 |
| 2007/0088096 A1 * | | 4/2007 | Mitra et al. | A61K 6/0023 523/115 |
| 2008/0087291 A1 * | | 4/2008 | Jordan | A45D 29/001 132/200 |
| 2008/0187710 A1 * | | 8/2008 | Stanchfield et al. | A47G 23/03 428/99 |
| 2008/0206583 A1 * | | 8/2008 | Phan | B32B 7/12 428/523 |
| 2008/0256890 A1 * | | 10/2008 | Pervan | E04F 15/04 52/588.1 |
| 2009/0007935 A1 * | | 1/2009 | Newman | B08B 7/0028 134/6 |
| 2009/0205980 A1 * | | 8/2009 | Hart | B44D 3/125 206/209 |
| 2009/0250166 A1 * | | 10/2009 | Pachl | C08F 2/48 156/308.2 |
| 2010/0019084 A1 * | | 1/2010 | Sisk | B64F 5/00 244/1 R |
| 2011/0030712 A1 * | | 2/2011 | Jordan | A45D 29/001 132/200 |
| 2011/0131901 A1 * | | 6/2011 | Pervan | E04F 15/04 52/177 |
| 2011/0305886 A1 * | | 12/2011 | Phan | B32B 9/02 428/201 |
| 2013/0312904 A1 * | | 11/2013 | Pachl | C08F 2/48 156/275.5 |
| 2014/0033635 A1 * | | 2/2014 | Pervan | E04F 15/04 52/588.1 |
| 2015/0306840 A1 * | | 10/2015 | Ferguson, Jr. | B29D 99/0089 428/70 |
| 2016/0069028 A1 * | | 3/2016 | Rieth | D21H 23/56 162/125 |

* cited by examiner

SYSTEM, KIT, AND METHOD OF RESURFACING AND/OR EMBELLISHING A COUNTERTOP

CROSS-REFERENCE TO RELATED APPLICATIONS

This application claims priority pursuant to 35 U.S.C. 119(e) to U.S. Provisional Patent Application Ser. No. 62/056,593, filed Sep. 28, 2014, the entire disclosure of which is incorporated herein by reference.

FIELD OF THE INVENTION

The present invention relates generally to the field of home remodeling. More particularly, the present invention relates to a system, kit, and method of resurfacing and/or embellishing a countertop.

BACKGROUND OF THE INVENTION

Kitchen, bathroom and other work surface countertops often are extremely significant to the aesthetics within the room in which they are located. Home/business owners will typically spend thousands of dollars or more for new countertops of various preferred materials. For example, granite and marble countertops are often extremely desirable for their aesthetic appearance, but are also extremely expensive. The aesthetic appearance of granite and marble is also extremely desirable for other surfaces, such as walls, floors, columns, support pillars, furniture, and other items for which the finish of the items are important.

Often when a home/business owner wants to remodel an area, they will desire to update one or more surface, such as a countertop surface, to a more modern or different aesthetic appearance, such as granite. In many instances, however, the use of such materials is cost prohibitive. In other instances, various structural concerns, such as weak structural supports, and/or desired features, such as recesses and/or offsets, make it impractical and/or infeasible to utilize heavy slabs of material that are difficult or impossible to shape, form, cut, and/or otherwise manipulate. As an alternative, many individuals will utilize products or DIY techniques that allow for the resurfacing of existing surfaces, such as floor surfaces, wall surfaces, column surfaces, pillar surfaces, countertop surfaces, furniture surfaces, and the like, in a style that simulates the more expensive material. Most such products/techniques utilize various multi-step painting techniques to achieve the random-patterned natural surface appearance. Nevertheless, such utilization of such products/techniques is often extremely time consuming, susceptible to flaws that tarnish the appearance, and/or does not fully simulate the three-dimensional appearance of natural materials such as granite.

Therefore, it would be beneficial to provide a system, kit and/or method of resurfacing and/or embellishing an existing surface, such as a countertop surface, that is relatively quick and easy to utilize, that minimizes flaws in the final appearance, and that simulates the three-dimensional appearance of natural materials such as granite. Furthermore, it would be beneficial if the system and/or method could be used to resurface a variety of features, including corners, recesses, and offsets. Furthermore still, it would be beneficial if the finished product was relatively light compared with natural stone so that that additional structural support would not be required.

In addition to other systems and methods being time-consuming and difficult to apply, the use of multiple materials and multiple techniques makes it time-consuming and difficult to gather together the required materials. For instance, materials are often sold in standard unit sizes of material with varying coverage areas depending on the particular application. Often, the standard unit sizes are not the same for each material required for a project. Even when the standard unit sizes are the same, the coverage areas for each material is often different. As a result, it is time-consuming and difficult for a user to calculate how much of each material is necessary for a particular project and/or it is time-consuming and difficult for the user to determine how many units of each material is required to complete a particular project. Furthermore, at least because the unit sizes and/or coverage areas are often different for each material, the user is often required to purchase excess materials to ensure that the user has enough of each material to complete a particular project. Therefore, it would be beneficial to provide a kit that includes materials in amounts that each correspond with the same coverage area so that a user can more quickly and easily determine how many kits to purchase for a particular project rather than be required to determine how many units to purchase of each material.

Other systems and methods of the prior art also often require a plurality of special tools. Unfortunately, these tools are often sold separately from the materials for which they are required. Furthermore, it is not always initially clear whether one or more of the same tool is required for a particular project and/or how much coverage area for which a particular tool is capable of being used. Consequently, it is time-consuming and difficult for a user to collect all of the tools required for a particular project. Therefore, it would be beneficial to provide a kit that includes some or all tools that are required for a system and/or method. Furthermore, it would be beneficial if the kit included a sufficient quantity of each tool to correspond with a coverage area for materials provided in the kit.

SUMMARY OF THE INVENTION

The instant invention provides a system, kit and/or method of resurfacing and/or embellishing a surface, such as a countertop surface, that is relatively quick and easy to utilize. The instant invention also provides a system, kit and/or method of resurfacing and/or embellishing a surface that minimizes flaws in the final appearance. The instant invention further provides a system, kit and/or method of resurfacing and/or embellishing a surface that simulates the three-dimensional appearance of natural materials such as granite and/or other materials having desirable aesthetic properties.

An embodiment of the instant invention includes a kit for resurfacing a countertop. Some such kits include pre-determined amounts of various materials such as cleaner, primer, adhesive, paper, and/or sealing fluid. In some such embodiments, the quantity of each material correlates with the quantity of all other materials such that the kit contains sufficient amounts of each material so as to refinish and/or embellish a specified area. In other embodiments, the kit includes one or more tool for utilizing the materials to refinish and/or embellish the surface. In some such embodiments, the one or more tool includes a cleaning tool, a priming fluid applicator, an adhesive applicator, a paper smoother, a sealing fluid applicator, and/or a sealing fluid holding device. The present invention also includes a system and method for refinishing and/or embellishing a surface. In some embodiments, the system includes cleaning the surface, applying a priming fluid to the surface so as to create a primer layer on the surface, applying paper and adhesive to the primer layer so as to create a paper layer, and/or applying a sealing fluid to the paper layer so as to create a sealer layer. In some such embodiments, the sealer layer seals the paper layer between the sealer layer and the surface so as to protect the paper layer. In other such embodiments, the paper includes one or more feature, such as coloring, edging, and/or overlapping features, so that the combination of the paper layer and the sealer layer causes light reflecting off of the paper layer and traveling through the sealer layer to provide a generally three-dimensional appearance that is reminiscent of the appearance of natural stone The system, kit and method of the instant invention results in a repairable/refinishable surface. By being repairable, minor damage, and sometimes major damage, is less detrimental to surfaces produced by the present invention than it is to other, less repairable surfaces. By being refinishable, future desired changes to the surface (such as to implement a new look when the present look is no longer functional or desirable) are less costly to implement than for other surfaces that are not refinishable. In addition, at least because the surface is repairable and refinishable, the instant invention is environmentally friendly, as the user is not tearing out the old surface and taking it to a land fill.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
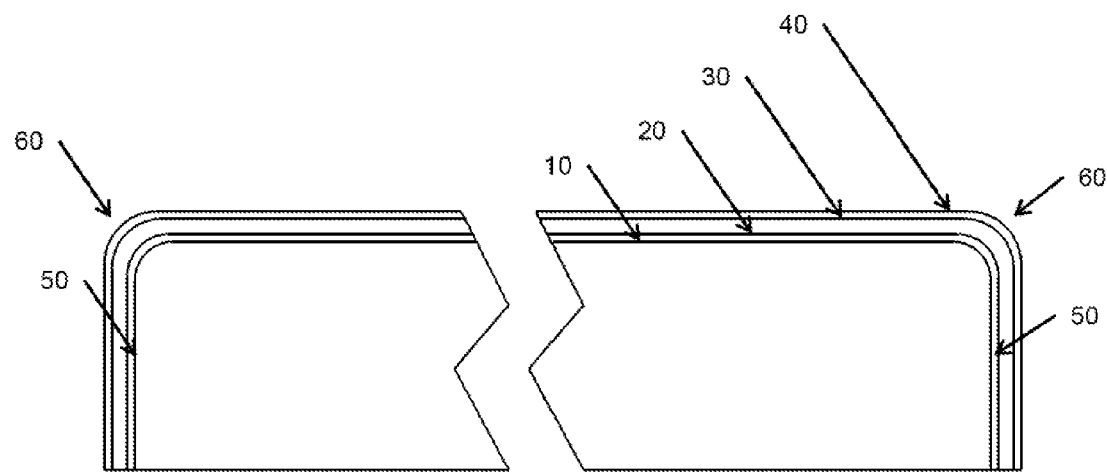
FIG. 1 is a truncated sectional view of a horizontal surface for which an embodiment of the present invention has been utilized, the view showing layers of material wrapping around opposed edges of the horizontal surface onto opposed vertical surfaces.
Figure 2:
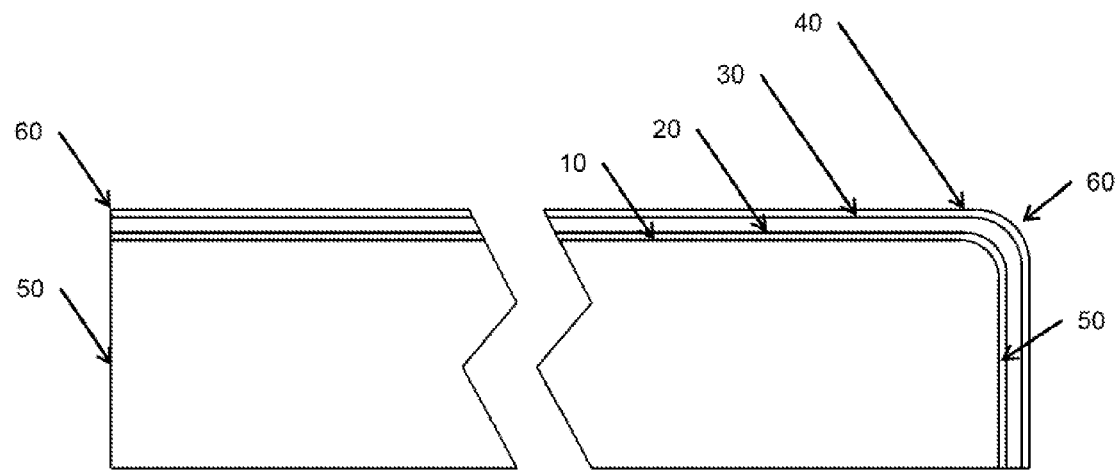
FIG. 2 is a truncated sectional view of a horizontal surface for which an embodiment of the present invention has been utilized, the view showing layers of material wrapping around one edge of the horizontal surface onto a vertical surface.
Figure 3:
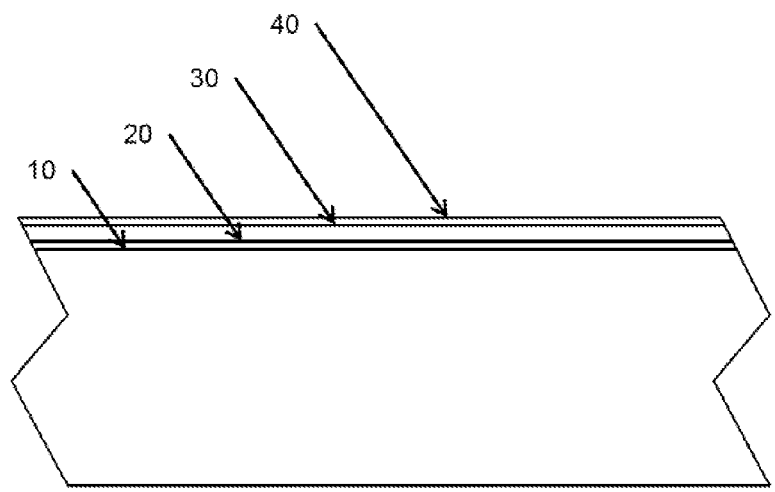
FIG. 3 is a truncated sectional view of a horizontal surface for which an embodiment of the present invention has been utilized, the view showing layers of material on the horizontal surface.
Figure 4:
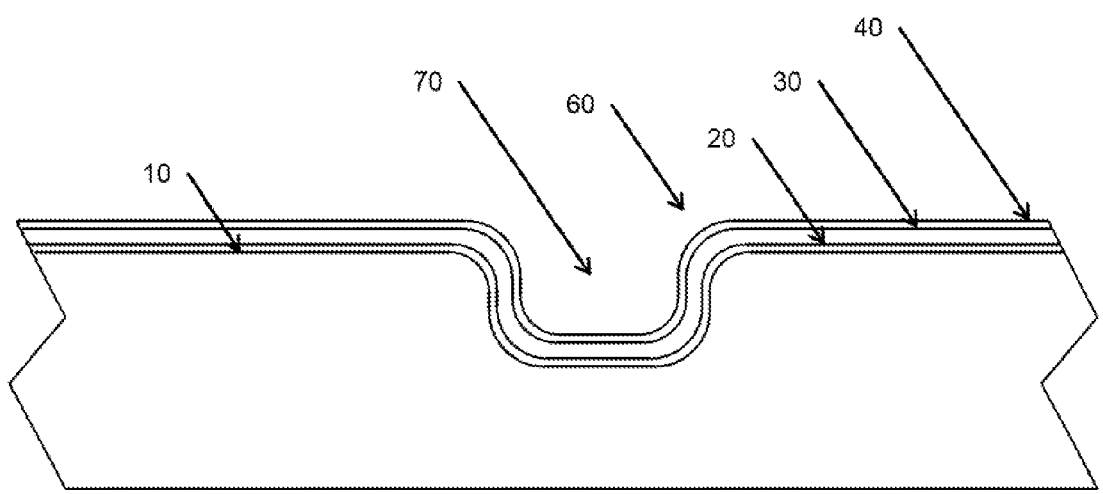
FIG. 4 is a partial sectional view of a surface for which an embodiment of the present invention has been utilized, the view showing layers of material extending through a recessed portion of the horizontal surface.
Figure 5:
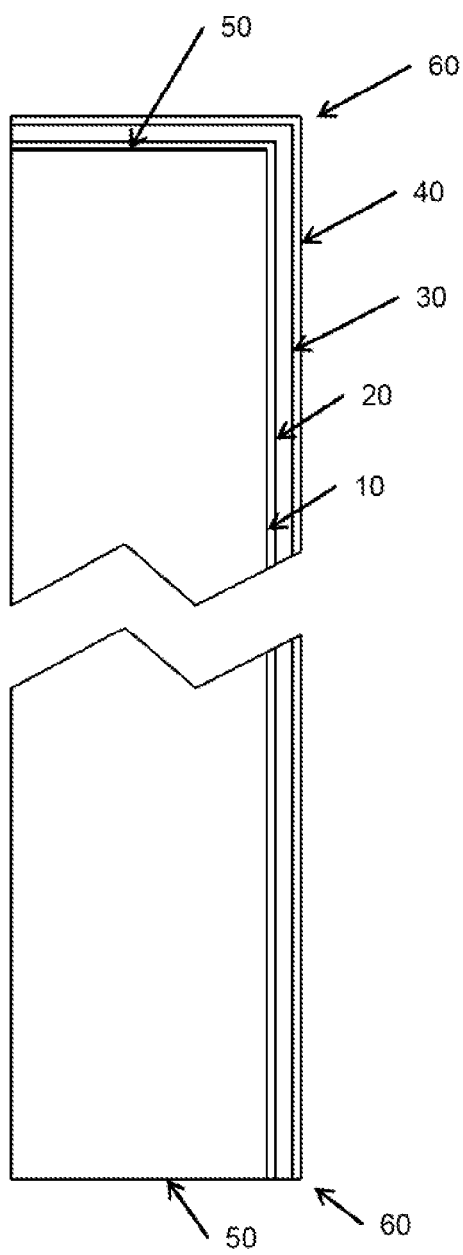
FIG. 5 is a truncated sectional view of a vertical surface for which an embodiment of the present invention has been utilized, the view showing layers of material wrapping around one edge of the vertical surface.
Figure 6:
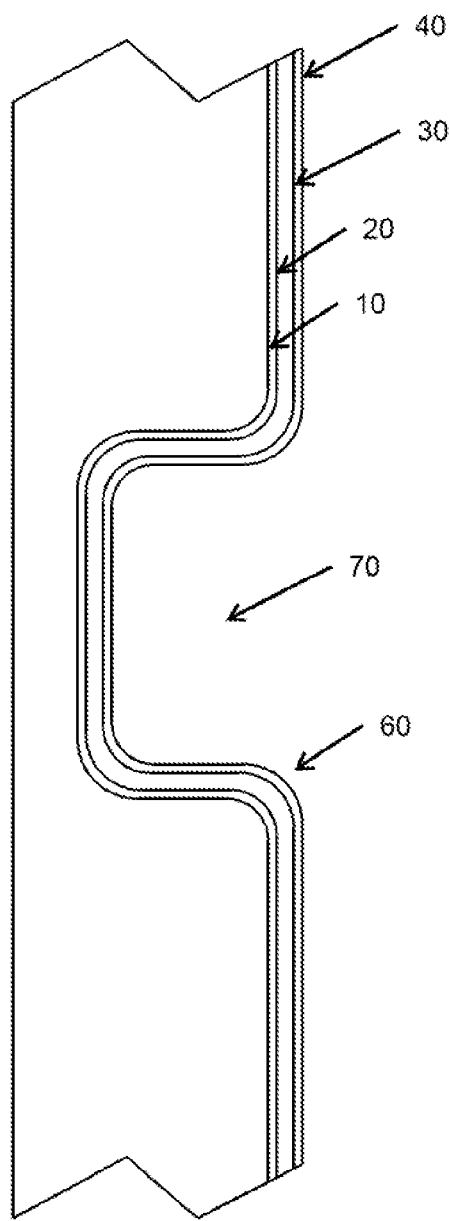
FIG. 6 is a partial sectional view of a vertical surface for which an embodiment of the present invention has been utilized, the view showing layers of material extending through a recessed portion of the vertical surface.
Figure 7:
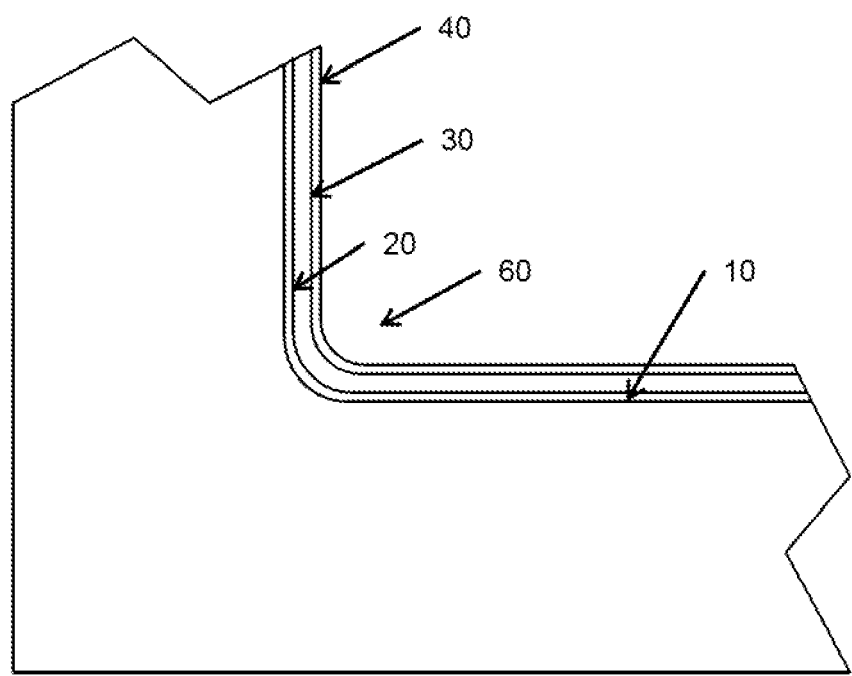
FIG. 7 is a partial sectional view of vertical and horizontal surfaces for which an embodiment of the present invention has been utilized, the view showing layers of material extending through the transition between the vertical and horizontal surfaces.
Figure 8:
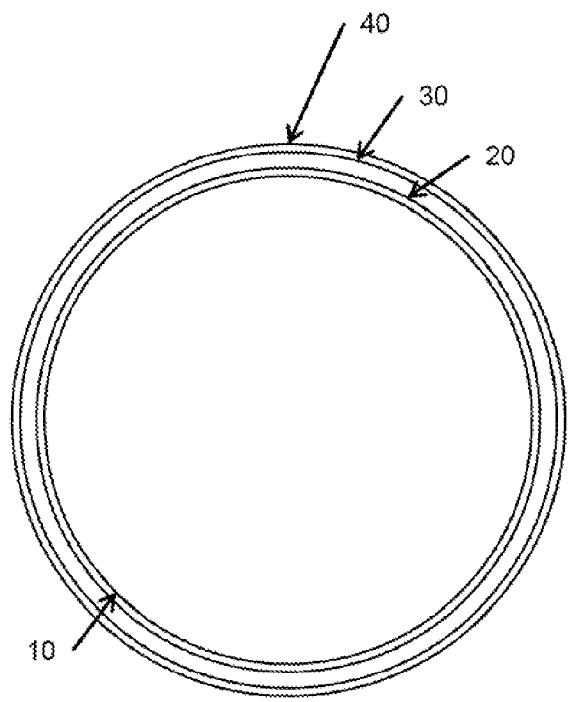
FIG. 8 is a sectional view of a circular column for which an embodiment of the present invention has been utilized, the view showing layers of material covering an exterior surface of the column.
Figure 9:
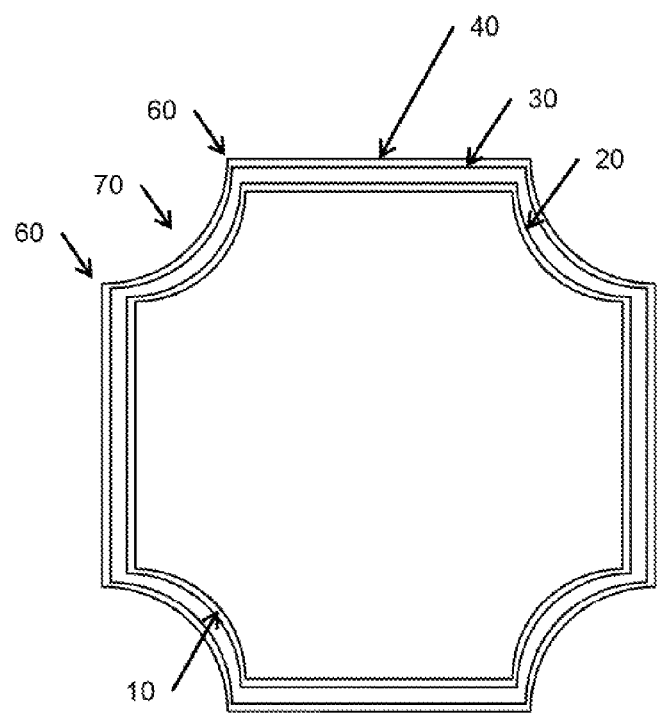
FIG. 9 is a sectional view of a decorative column for which an embodiment of the present invention has been utilized, the view showing layers of material covering the exterior surfaces of the column.
Figure 10:
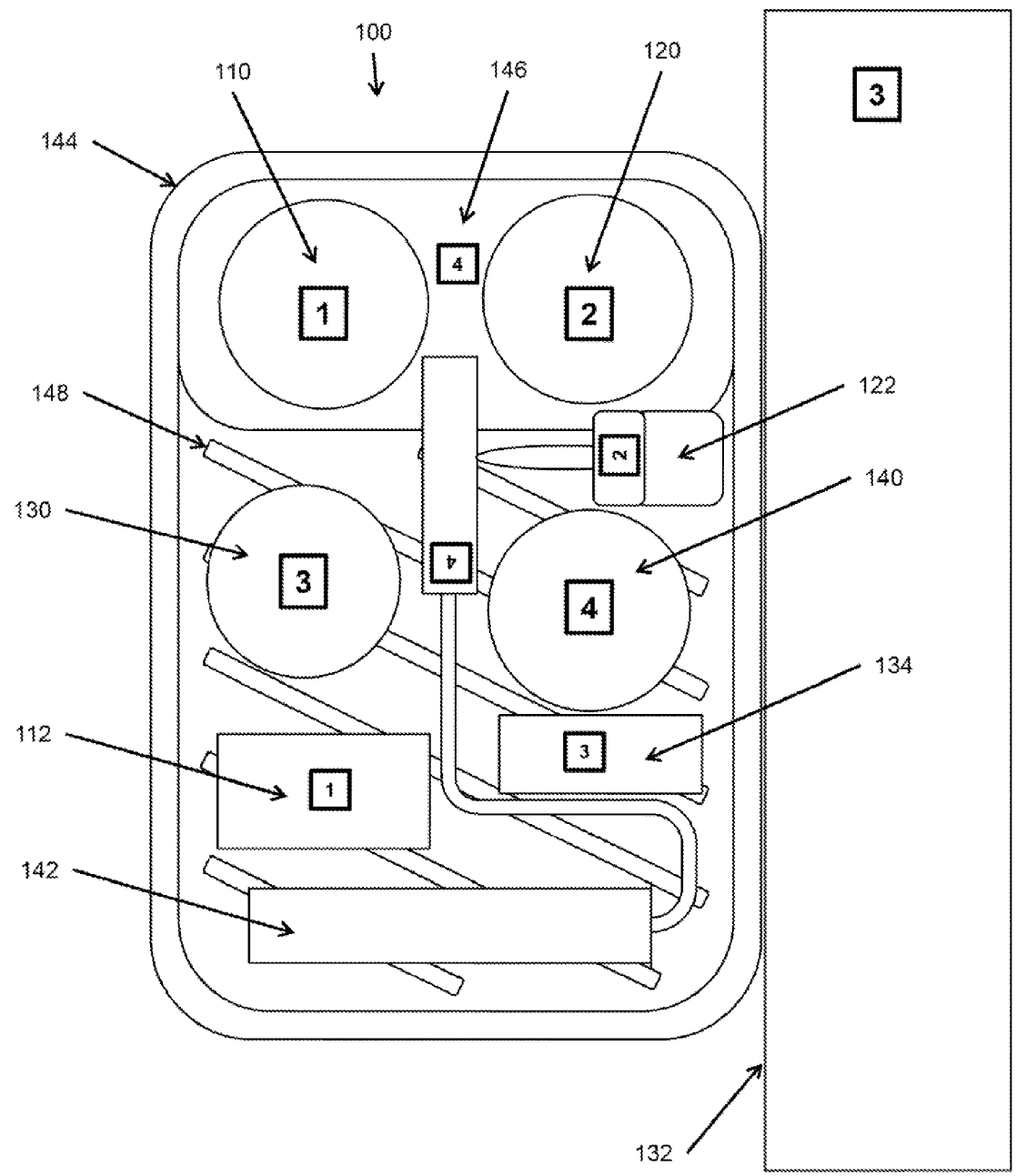
FIG. 10 is an embodiment of a kit of the present invention.

Referring to FIGS. 1 and 10, a preferred embodiment of the present invention includes a kit 100 for resurfacing and/or embellishing one or more surface 10. In some embodiments, the kit 100 includes a plurality of containers for holding a plurality of materials, each material being designated for one or more purpose associated with resurfacing and/or embellishing the surface 10. In other embodiments, the kit 100 includes one or more tool for assisting a user in resurfacing and/or embellishing the surface 10. In still other embodiments, the kit 100 includes one or more instruction for helping a user prepare the surface 10, cover the surface 10, finish the surface 10, and/or otherwise utilize one or more material and/or tool of the kit 100. In some such embodiments, the one or more instruction includes instructions on how to utilize one or more tool for performing one or more step associated with the kit 100 and/or with resurfacing and/or embellishing a surface 10. In other such embodiments, the one or more instruction includes information pertaining to where a user can find additional instructions on how to utilize the kit 100, how to acquire additional materials, and/or how to apply the materials in the kit 100 to the surface 10 so as to resurface and/or embellish the surface 10.

In some embodiments, the kit 100 includes a cleaning fluid container 110 for holding a volume of cleaning fluid, a priming fluid container 120 for holding a volume of priming fluid, and/or an adhesive container 130 for holding a volume of adhesive. In some embodiments, the volume of each material is pre-determined such that the volume of each material correlates with a pre-determined surface area dimension.

In some embodiments, the use of the cleaning fluid on a surface 10 is compatible with subsequent use of the priming fluid on the surface 10 such that the priming fluid is capable of creating a primer layer 20 that is secured to the surface 10. In this way, a user is able to utilize the materials provided in the kit 100 to clean and prime one or more surface 10. In other embodiments, the adhesive is compatible with the priming fluid such that the adhesive is capable of adhering to the primer layer 20 and/or the surface 10.

In some embodiments, the cleaning fluid is a specialized cleaning solution that is specially formulated for the process of the instant invention. In other embodiments, a standard cleaning fluid is included. In still other embodiments the cleaning fluid is compatible for cleaning one or more types of surfaces.

In some embodiments, the priming fluid is a specialized priming solution that is specially formulated for the process of the instant invention. In other embodiments, a standard priming fluid is included. In still other embodiments, the priming fluid is compatible for priming one or more types of surfaces.

In some embodiments, the adhesive is a specialized adhesive that is specially formulated for the process of the instant invention. In other embodiments, a standard adhesive is included. In still other embodiments, the adhesive is compatible for adhering to one or more types of surfaces.

In a preferred embodiment, the kit 100 includes a container of paper 132. In some embodiments, the container of paper 132 includes a pre-determined amount of paper that correlates with a pre-determined surface area dimension.

In some embodiments, the paper is handmade paper that is painted or otherwise imprinted to include a pattern that resembles a natural material. In some such embodiments, the paper is painted to resemble the appearance of granite. In other such embodiments, the background color of the paper is black or brown. In some embodiments multiple sheets of paper are included in which some sheets have a black background color and other sheets have a brown background color. In some embodiments the paper is provided in multiple sheets of standard size. For example, in some embodiments, the paper is provided in 2 foot by 2 foot square sheets. In other embodiments, the paper is provided as large folded sheets and/or on large rolls.

In some embodiments, the paper is made on 16'×4' tables and the size of the paper is 16 ft×4 ft. The paper is capable of being torn or cut down to a smaller size, such as approximately 2 foot by 2 foot squares. In some embodiments, the actual size is roughly 2 foot by 2 foot, but varies somewhat in a generally random pattern for packaging. In other embodiments, the container of paper 132 includes random sizes of paper. In other embodiments, the paper is capable of being refined into smaller sizes ranging from large, medium and small. In some such embodiments, the smaller pieces are capable of being cut in half with a straight edge for the edges of a surface 10, such as the edge of a countertop. By cutting a piece in half a single piece of paper is capable of providing two edge pieces. The paper is also capable of being cut by other methods and/or into other shapes, such as by using a square to cut perpendicular edges such that the cut paper is capable of nesting within an inside corner of a surface.

In some embodiments, a single piece of paper is capable of overlapping one or more other piece of paper such that multiple pieces of paper are capable of resting at least partially on other pieces of paper and/or allow other pieces of paper to at least partially rest upon them. To the extent that a particular piece of paper overlaps another piece of paper more than a desired amount, one or more of the pieces of paper are capable of being moved, cut, and/or torn so as to reduce the amount of overlap. In the event that additional overlap is desired, one or more piece of paper is capable of being moved and/or added until the desired results are achieved. This versatility facilitates very efficient use of all the paper, sometimes resulting in little to no waste as the user is able to use all sizes and shapes, including all cuts, tears, and corners. In some embodiments, any leftover paper is saved by the user for touchup in the event there is any damage later.

In a preferred embodiment, the kit 100 includes an amount of paper in addition to one or more containers for holding one or more fluid such as cleaning fluid, priming fluid, and/or adhesive. In some embodiments, the volume of each material and the amount of paper is pre-determined such that the volume of each material and the amount of paper correlates with a pre-determined surface area dimension. In other embodiments, the adhesive is compatible with the priming fluid and the paper is compatible with the adhesive so as to enable the adhesive to adhere the paper to the primer layer 20 so as to create a paper layer 30 that is secured to the primer layer 20 and/or to the surface 10. In some embodiments, the paper layer 30 completely covers the primer layer 20 such that the primer layer 20 is not visible. In other embodiments, the paper layer 30 is a paper and adhesive layer 30. In other embodiments, the adhesive leaches into and/or through the primer layer 20, the paper layer 30, and/or the surface 10 such that at least a portion of the adhesive becomes embedded within the primer layer 20, the paper layer 30, and/or the surface 10.

In a preferred embodiment, the kit also includes a sealing fluid container 140 for holding a volume of sealing fluid. In some embodiments, the volume of sealing fluid is pre-determined so as to correlate with a pre-determined surface area dimension. In some such embodiments, the pre-determined surface area dimension associated with the volume of sealing fluid is the same as a pre-determined surface area associated with one or more other volume of material provided with the kit 100 and/or a pre-determined surface area associated with an amount of paper provided with the kit 100.

In some embodiments, the sealing fluid is compatible with the paper, the adhesive, and the priming fluid such that the sealing fluid is capable of creating a sealing layer 40 that is secured to the paper layer 30, the primer layer 20, and/or the surface 10. In this way, a user is able to utilize the materials provided with the kit 100 to protect the paper layer 30 by sealing the paper layer 30 between the sealing layer 40 and the surface 10. In some embodiments, the sealing layer 40 is translucent such that light traveling through the sealing layer 40 is able to reflect off of the paper layer 30 so as to provide a generally three-dimensional appearance that is reminiscent of the appearance of natural stone. In some embodiments, the adhesive is completely concealed by the paper layer 30 and/or is otherwise not visible through the sealer layer 40. In other embodiments, at least some of the adhesive is visible through the sealer layer 40. In some such embodiments, light reflecting off of the visible portion of the adhesive provides a generally three-dimensional appearance that is reminiscent of a natural material, such as natural stone and/or some other natural material that is commonly associated with natural stone.

In some embodiments, the kit 100 includes one or more tools for utilizing the materials in the kit. In some such embodiments, the kit 100 includes one or more cleaning tool 112 such as a rag, a sponge, or some other device that is capable of assisting a user apply the cleaning solution to a surface and/or remove residue and/or debris from the surface. In other such embodiments, the kit 100 includes one or more priming fluid applicator 122 such as a brush, a paint roller, or some other device that is capable of assisting a user apply the priming fluid to the surface. In still other such embodiments, the kit 100 includes one or more adhesive applicator (not shown). In yet other such embodiments, the kit 100 includes a paper smoother tool 134 for smoothing the paper relative to the surface prior to sealing the paper between the sealing layer and the surface and/or to assist in obtaining a more even distribution of adhesive between one or more piece of paper and the surface prior to the adhesive setting.

In a preferred embodiment, the kit 100 includes one or more sealing fluid applicator 142. In some embodiments, the sealing fluid applicator 142 is a roller that is configured to apply sealing fluid to the paper layer 30. In some such embodiments, the roller 142 comprises a sponge roller to apply the sealing fluid without resulting in any "fuzz" coming off the roller during the finishing process.

In some embodiments, the kit 100 includes one or more sealing fluid holding device 144. In some such embodiments, the sealing fluid holding device 144 is a roller pan that is configured to pool a volume of sealing fluid in a recessed portion 146 of the roller pan 144. In this way, the roller pan 144 is configured to enable a user to collect an amount of sealing fluid on a roller 142 so that the sealing fluid can be applied to the paper layer 30. In other embodiments, the sealing fluid holding device 144 includes a plurality of ridge elements 148. By raking an sealing fluid applicator 142 across one or more ridge element 148, a user is able to remove excess sealing fluid from the sealing fluid applicator 142.

In some embodiments, one or more container and/or tool includes one or more indicia so as to provide a user with an indication of which tools should be used with which materials and when the materials and/or tools should be used relative to the use of other materials and/or tools. For instance, in some embodiments each container and tool includes a number designation for designating which tools and/or materials should be used in a particular step. In some such embodiments, a container 110 of cleaning fluid and a cleaning tool 112 are each marked with a "1" designation so as to indicate that the cleaning fluid within the container 110 should be used first and that the cleaning tool 112 should be used with the cleaning fluid. In other embodiments, a container 120 of priming fluid and a priming fluid applicator 122 are each marked with a "2" designation so as to indicate that the priming fluid within the container 120 should not be used until after the surface is clean and that the priming fluid applicator 122 can be used with the priming fluid. In still other embodiments, a container 130 of adhesive, a container of paper 132, and/or a paper smoothing tool 134 are each marked with a "3" designation so as to indicate that the adhesive and the paper should not be used until after the primer layer 20 is complete and that the adhesive, the paper, and/or the paper smoothing tool 134 can be used together. In yet other embodiments, a container 140 of sealing fluid, a sealing fluid applicator 142, and/or a sealing fluid holding device 144 are each marked with a "4" designation so as to indicate that the sealing fluid should not be used until after the paper layer 30 is complete and that the sealing fluid, the sealing fluid applicator 142, and/or the sealing fluid holding device 144 can be used together.

Referring to FIGS. 1-9, an embodiment of the method of the instant invention is capable of adding multiple layers of material to an existing surface 10 of various sizes and shapes and/or having various features so as to refinish and/or embellish the surface 10. In some embodiments, the surface 10 is a countertop, a floor, a wall, a column, a pillar, furniture, or some other similar surface. In some such embodiments, the surface 10 defines one or more edge 50, corner 60, and/or recessed area 70. The first step of a preferred embodiment of the method requires the user to cover and protect items in the vicinity of the surface 10, such as cabinets and/or other surfaces that are located within a vicinity of a countertop. In some such embodiments tape and/or clear plastic is utilized. In some embodiments of the kit 100, the tape and/or clear plastic and/or some other protection and/or covering materials are included as part of the kit 100.

Once the surrounding items have been protected, the surface 10 is cleaned to remove any debris or residue from the surface 10. In some such embodiments, the surface 10 is cleaned using a cleaning fluid that is provided in a cleaning fluid container 110 of the kit 100. In other such embodiments, the surface 10 is cleaned using a cleaning device 112, such as a sponge or a rag, that is provided with the kit 100.

In some embodiments, cracks, chip marks, and/or other imperfections in the surface are filled and/or otherwise fixed so as to smooth out the surface 10. In some such embodiments, a filler material for cracks and/or chips is included with the kit 100. In other such embodiments, a tool for filing chips and/or cracks, such as a putty knife, is also included with the kit 100. In some embodiments, the surface 10 is cleaned again after the chips and/or crafts are filled.

In some embodiments, the priming fluid is applied to the surface 10 after the surface has been cleaned. The priming fluid is then allowed to cure so as to create a primer layer 20 that is secured to the surface 10. In some such embodiments, the priming fluid is applied with a priming fluid applicator 122 such as a brush or a roller. In some embodiments, the priming fluid applicator 122 is also a sealing fluid applicator 142.

In some embodiments, the surface is measured to calculate the amount of paper required to cover the surface. In some embodiments to cover an average 40 square foot standard kitchen countertop, it will take 60% overage on the paper or 60% additional to account for the overlap and to leave a small excess for touchup later someday down the road if needed. 40 square foot×1.60=64 square foot total of paper needed to cover a 40 square foot countertop.

In some embodiments the paper is torn into different shapes and sizes, utilizing a variety of tearing techniques to create unique and natural-looking, random pattern appearances. In some embodiments, a variety of tearing techniques are utilized independently as well as in combination with one or more other techniques listed below and/or alternative techniques now known or hereinafter developed.

In some embodiments, tearing the paper leaves different effects on the edges such as a "clean tear", or a "frayed edge tear". Some such effects result in colors of background papers showing. In some such embodiments, background papers are black or brown depending on the color of the paper chosen. In some embodiments, a non-frayed edge is achieved by grasping one or more piece of paper between respective palms and thumbs of opposed hands and pulling the paper with each hand with equal force. In some embodiments, a frayed edge is achieved by grasping the paper with the palm and thumb of one hand and pulling the paper away and slightly upward and outward while keeping the other palm and thumb of the other hand stationary in place.

In some embodiments, the paper is torn in one or more ways to go around corners, over edges, and/or into recessed areas. In some such embodiments, corners and/or edges are cut when the paper is dry and/or the corners and/or edges are cut with a straight edge and a knife. In some embodiments, the paper is made wet and torn in approximately ½ to 1 inch increments around a curve to allow the paper to be folded around an edge.

After the paper is torn and/or otherwise prepared for use on the surface, the paper is adhered to the primed surface with an adhesive, such as glue. In some embodiments, the adhesive is applied to the paper using an adhesive applicator, such as a roller. In some such embodiments, the adhesive applicator is supplied with the kit. In some such embodiments, the adhesive applicator is also a primer applicator and/or a sealer applicator. In other such embodiments, a separate tool is provided and/or utilized as an adhesive applicator.

In some embodiments, the paper is installed by overlapping different sizes of paper. In some such embodiments, the overlapping process leaves unique stone like shapes or layered looks when installed. In this way, the paper forms a paper layer 30.

In some embodiments, one or more piece of paper is wrapped around an edge of the surface, into a recessed area of the surface, and/or over a corner or curve of the surface. In some such embodiments, edges, corners, curves, and/or recessed portions of the surface are covered with paper before larger flat portions of the surface is covered with paper. In some embodiments in which the paper is torn to fit around curves or edges, the paper is first wetted by applying the adhesive to the back side of the paper, and then torn. In some embodiments, a paper smoother 134 is used to smooth the paper and/or to smooth the adhesive.

Once the paper layer 30 is complete, a sealing fluid is applied to the paper layer 30 so as to create a sealer layer 40. In some embodiments, the sealing layer 40 adheres to the paper layer 30, the primer layer 20, and/or the surface 10. In some embodiments, the sealing fluid is applied by a sealing fluid applicator 142, such as a roller, that is provided in the kit 100. In some such embodiments, the sealing fluid is first poured from a sealing fluid container into a sealing fluid holding device 144, such as a roller pan, so that the sealing fluid can be collected by the sealing fluid applicator for subsequent application on the paper layer 30 of the present invention.

In some embodiments, the kit includes one or more material and/or one or more tool. In some such embodiments, the kit includes a plurality of materials but no tools. In other such embodiments, the kit includes a plurality of tools but no materials. In still other such embodiments, the kit includes a plurality of materials or tools and at least one respective tool or material for implementation of one or more system or method of the present invention. In some embodiments, one kit includes the materials and another kit includes the tools.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A kit for refinishing a surface, the kit comprising:
  a priming fluid container for holding a pre-determined volume of priming fluid, the priming fluid being capable of creating a primer layer that is secured to the surface;
  an adhesive container for holding a pre-determined volume of adhesive, the adhesive being compatible with the priming fluid so as to enable the adhesive to adhere to the primer layer;
  a pre-determined amount of paper, the paper being compatible with the adhesive so as to enable the adhesive to adhere the paper to the primer layer, thereby creating a paper layer; and
  a sealing fluid container for holding a pre-determined amount of sealing fluid, the sealing fluid being compatible with the paper, the adhesive, and the priming fluid so as to enable the sealing fluid to create a sealing layer to protect the paper layer by sealing the paper layer between the surface and the sealing layer;
  wherein the sealing layer is translucent such that light traveling through the sealing layer is able to reflect off of the paper layer so as to provide a generally three-dimensional appearance that is reminiscent of the appearance of natural stone.

2. The kit of claim 1, wherein the surface is a surface of one of a countertop, a floor, a wall, a column, a pillar, or furniture.

3. The kit of claim 1, further comprising a paper smoother for smoothing paper relative to the surface prior to sealing the paper between the sealing layer and the surface.

4. The kit of claim 1, further comprising a roller and a roller pan, the roller being configured to apply sealing fluid to the paper layer and the roller pan being configured to pool a volume of sealing fluid at one or more location so as to enable a user to collect an amount of sealing fluid on the roller so that the sealing fluid can be applied to the paper layer.

5. The kit of claim 1, wherein the pre-determined amount of paper correlates with a pre-determined surface area dimension.

6. The kit of claim 5, wherein the pre-determined volumes of priming fluid, adhesive, and sealing fluid each correlate with the pre-determined surface area dimension.

7. The kit of claim 1, wherein the paper is painted or otherwise imprinted to include a pattern that resembles a natural stone.

8. The kit of claim 7, wherein the paper resembles the appearance of granite.

9. A method of refinishing a surface, the method including:
cleaning the surface with a cleaning fluid;
applying a priming fluid to the surface;
allowing the priming fluid to cure so as to create a primer layer that is secured to the surface;
utilizing adhesive to secure a plurality of paper pieces to the primer layer of the surface;
applying sealing fluid over the paper;
allowing the sealing fluid to cure so as to create a sealing layer that seals the paper between the surface and the sealing layer;
wherein the sealing layer is translucent such that light traveling through the sealing layer is able to reflect off of the paper so as to provide a generally three-dimensional appearance that is reminiscent of the appearance of natural stone.

10. The method of claim 9, wherein the surface is a surface of one of a countertop, a floor, a wall, a column, a pillar, or furniture.

11. The method of claim 9, further comprising tearing the edges of the paper so as to give the paper a more natural appearance.

12. The method of claim 9, further comprising smoothing the paper relative to the surface prior to the applying sealing fluid step.

13. The method of claim 12, wherein the smoothing step is accomplished with a paper smoother.

14. The method of claim 9, further comprising wrapping the paper around a corner.

15. The method of claim 9, further comprising wrapping the paper into a recessed area of the surface.

16. The method of claim 9, further comprising wrapping the paper around a curve of the surface.

17. The method of claim 9, further comprising wrapping the paper into a curve of the surface.

18. The method of claim 9, wherein the applying sealing fluid step includes using a roller to transfer sealing fluid from a roller tray to the paper.

19. The method of claim 9, wherein the paper is painted or otherwise imprinted to include a pattern that resembles a natural stone.

20. The method of claim 19, wherein the paper resembles the appearance of granite.

* * * * *